US012608430B2

(12) United States Patent 　　　　　(10) Patent No.: US 12,608,430 B2

Varshney et al. 　　　　　　　　　　(45) Date of Patent: Apr. 21, 2026

(54) METHOD AND SYSTEM FOR DATA ARCHIVING AND RETRIEVAL IN DISTRIBUTED SEARCH AND ANALYTICS ENVIRONMENT

(71) Applicant: JPMorgan Chase Bank, N.A., New York, NY (US)

(72) Inventors: Lekhraj Varshney, Mumbai (IN); Nilesh Chittal, Mumbai (IN); Pranav Gandhi, Bhayander (IN); Bindu Kulkarni, Bengaluru (IN); Kritika Jain, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/422,516

(22) Filed: Jan. 25, 2024

(65) Prior Publication Data

US 2025/0190499 A1 　　Jun. 12, 2025

(30) Foreign Application Priority Data

Dec. 12, 2023 　(IN) ............................. 202311084758

(51) Int. Cl.
　*G06F 16/90* 　　(2019.01)
　*G06F 16/951* 　　(2019.01)
　*G06F 16/953* 　　(2019.01)

(52) U.S. Cl.
　CPC .......... *G06F 16/951* (2019.01); *G06F 16/953* (2019.01)

(58) Field of Classification Search
　CPC .............................. G06F 16/951; G06F 16/953

USPC ................................ 707/673, 674, 679, 681
See application file for complete search history.

(56) References Cited

U.S. PATENT DOCUMENTS

| | | | | |
|---|---|---|---|---|
| 10,095,220 | B1 * | 10/2018 | Addo .................... | G06Q 10/087 |
| 11,573,971 | B1 * | 2/2023 | Cannon ................. | G06F 16/252 |
| 11,693,713 | B1 * | 7/2023 | Vohra .................. | G06F 11/3433 |
| | | | | 718/104 |
| 11,829,606 | B2 * | 11/2023 | Derryberry ......... | G06F 11/2097 |
| 2018/0075107 | A1 * | 3/2018 | Park ...................... | G06F 16/278 |
| 2019/0311374 | A1 * | 10/2019 | Dai ........................ | G06F 40/205 |
| 2020/0250151 | A1 * | 8/2020 | Yin ......................... | G06F 16/27 |

(Continued)

FOREIGN PATENT DOCUMENTS

| | | | |
|---|---|---|---|
| WO | WO2023/139202 | * | 7/2023 |
| WO | WO2023/139202 A1 * | | 7/2023 |

*Primary Examiner* — Daniel A Kuddus
(74) *Attorney, Agent, or Firm* — GREENBLUM & BERNSTEIN, P.L.C.

(57) ABSTRACT

A method and a system for efficient data archiving and retrieval in a distributed search and analytics environment are disclosed. The method includes ingesting a real-time data stream from at least one data source. The method further includes segmenting the ingested data stream into at least one segment and storing each of the at least one segment across a set of nodes in at least one search engine cluster. The method further includes capturing and storing a set of resiliency snapshots of the at least one segment within the at least one search engine cluster after a first predefined time period. Thereafter the method includes creating at least one index snapshot based on the stored set of resiliency snapshots through a clone API after a second predefined time period and mounting the at least one index snapshot onto an archival search engine cluster using a mount option.

20 Claims, 5 Drawing Sheets

(56) References Cited

U.S. PATENT DOCUMENTS

| | | | |
|---|---|---|---|
| 2020/0401606 A1* | 12/2020 | O'Shaughnessy | G06F 16/273 |
| 2021/0034398 A1* | 2/2021 | Khandkar | G06F 11/1464 |
| 2021/0117232 A1* | 4/2021 | Sriharsha | G06F 9/544 |
| 2021/0117382 A1* | 4/2021 | Sriharsha | G06N 20/00 |
| 2021/0117416 A1* | 4/2021 | Sriharsha | G06F 17/16 |
| 2022/0247760 A1* | 8/2022 | Shanker | G06F 9/45558 |
| 2022/0263897 A1* | 8/2022 | Karr | G06F 11/1448 |
| 2022/0276987 A1* | 9/2022 | Guturi | G06F 16/164 |

* cited by examiner

400

Start

INGEST A REAL-TIME DATA STREAM FROM AT LEAST ONE DATA SOURCE S402

SEGMENT THE INGESTED DATA STREAM INTO AT LEAST ONE SEGMENT AND STORING EACH OF THE AT LEAST ONE SEGMENT ACROSS A SET OF NODES IN AT LEAST ONE SEARCH ENGINE CLUSTER S404

CAPTURE A SET OF RESILIENCY SNAPSHOTS OF THE AT LEAST ONE SEGMENT AND STORING THE CAPTURED SET OF RESILIENCY SNAPSHOTS OF THE AT LEAST ONE SEGMENT WITHIN THE AT LEAST ONE SEARCH ENGINE CLUSTER AFTER A FIRST PREDEFINED TIME PERIOD S406

CREATE AT LEAST ONE INDEX SNAPSHOT BASED ON THE STORED SET OF RESILIENCY SNAPSHOTS THROUGH A CLONE APPLICATION PROGRAMMING INTERFACE (API) AFTER A SECOND PREDEFINED TIME PERIOD, WHEREIN THE AT LEAST ONE INDEX SNAPSHOT IS A REFERENCE TO THE STORED SET OF RESILIENCY SNAPSHOTS S408

MOUNT THE AT LEAST ONE INDEX SNAPSHOT ONTO AN ARCHIVAL SEARCH ENGINE CLUSTER USING A MOUNT OPTION, WHEREIN THE ARCHIVAL SEARCH ENGINE CLUSTER COMPRISES BACKUP NODES ASSOCIATED WITH A STORAGE SYSTEM S410

End

FIG. 4

METHOD AND SYSTEM FOR DATA ARCHIVING AND RETRIEVAL IN DISTRIBUTED SEARCH AND ANALYTICS ENVIRONMENT

CROSS-REFERENCE TO RELATED APPLICATIONS

This application claims priority benefit from Indian Application No. 202311084758, filed Dec. 12, 2023 on in the India Patent Office, which is hereby incorporated by reference in its entirety.

FIELD OF THE DISCLOSURE

This technology generally relates to data management in distributed computing environments, and more particularly relates to methods and systems for archiving, storage, and retrieval of data in a distributed search and analytics environment.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Data archiving and retrieval are fundamental operations in the realm of distributed search and analytics. As data scales grow exponentially, particularly in sectors like finance, healthcare, and e-commerce, organizations face significant challenges in handling real-time data streams. Traditional methods often require complex management practices and could lead to inefficiencies in both storage and data retrieval. As a result, there is a growing need for solutions that offer efficient, reliable, and quick data archiving and retrieval capabilities in a distributed setting.

Various solutions exist for data archiving and retrieval, but most of them have limitations when applied to distributed search and analytics environments. Some methods focus solely on archiving, overlooking the need for efficient retrieval. Others may offer quick data retrieval but lack in providing resilient storage solutions, exposing them to data loss or corruption. In many cases, these methods are also not optimized for handling real-time data streams, which is a common requirement in many application scenarios today.

Hence, in view of these and other existing limitations, there arises an imperative need to provide a reliable system and method for data archiving and retrieval in a distributed search and analytics environment. The present invention aims to overcome the limitations of the prior art by providing a robust, streamlined method for managing high-velocity data ingestion and quick, reliable data retrieval.

SUMMARY

The present disclosure, through one or more of its various aspects, embodiments, and/or specific features or sub-components, provides, inter alia, various systems, servers, devices, methods, media, programs, and platforms for data archiving and retrieval for payment events data.

According to an aspect of the present disclosure, a method for efficient data archiving in a distributed search and analytics environment is disclosed. The method is implemented by at least one processor. The method includes ingesting, by the at least one processor, a real-time data stream from at least one data source. In addition, the method includes segmenting, by the at least one processor, the ingested data stream into at least one segment and storing each of the at least one segment across a set of nodes in at least one search engine cluster. Further, the method includes capturing, by the at least one processor, a set of resiliency snapshots of the at least one segment and storing the captured set of resiliency snapshots of the at least one segment within the at least one search engine cluster after a first predefined time period. Furthermore, the method includes creating, by the at least one processor, at least one index snapshot based on the stored set of resiliency snapshots through a clone Application Programming Interface (API) after a second predefined time period, wherein the at least one index snapshot is a reference to the stored set of resiliency snapshots. Thereafter, the method includes mounting, by the at least one processor, the at least one index snapshot onto an archival search engine cluster using a mount option, wherein the archival search engine cluster comprises backup nodes associated with a storage system.

In accordance with an exemplary embodiment, the at least one data source of the real-time data stream comprises at least one of an Internet of Things (IoT) device, an online service, a sensor array, and a financial transactional system.

In accordance with an exemplary embodiment, the set of nodes comprises at least one or a combination of archival data nodes and active data nodes.

In accordance with an exemplary embodiment, the method includes transferring, by the at least one processor, the set of resiliency snapshots to a resiliency snapshot repository, wherein the resiliency snapshot repository being hosted on a cloud storage container or a distributed file storage.

In accordance with an exemplary embodiment, the mount option enables a partial mount of at least one index snapshot, enabling selective data retrieval, and wherein the storage system is hosted at least on one of a cloud storage container or a distributed file storage.

In accordance with an exemplary embodiment, the method includes receiving, by the at least one processor, an asynchronous search engine request comprising a search query for a document referenced in the at least one index snapshot, wherein the asynchronous search engine request being processed by the search engine archive cluster.

In accordance with an exemplary embodiment, the method includes scanning, by the at least one processor, a localized cache associated with the archival search engine cluster for the queried document. Based on determining by the at least one processor that the queried document is not available in the local cache, searching, by the at least one processor, the at least one index snapshot to search for the queried document. Retrieving, by the at least one processor, the queried document. Displaying, by the at least one processor, a response through an API. The response comprising the queried document retrieved from the at least one index snapshot or the localized cache, or an error message indicating failure to locate the queried document.

In accordance with an exemplary embodiment, the method includes storing, by at least one processor, metadata associated with the at least one index snapshot in the localized cache to facilitate subsequent searched, wherein the metadata comprises information about structure and content of the at least one index snapshot.

In accordance with an exemplary embodiment, the first predefined time period and the second predefined time period are dynamically adjustable based on any or a combination of system load or data volume.

According to another aspect of the present disclosure, a computing device configured to implement the execution of a method for efficient data archiving in a distributed search and analytics environment is disclosed. The computing device includes: a processor; a memory; and a communication interface coupled to each of the processor and the memory. The processor may be configured to ingest a real-time data stream from at least one data source. In addition, the processor may be configured to segment the ingested data stream into at least one segment and storing each of the at least one segment across a set of nodes in at least one search engine cluster. Further, the processor may be configured to capture a set of resiliency snapshots of the at least one segment and storing the captured set of resiliency snapshots of the at least one segment within the at least one search engine cluster after a first predefined time period. Furthermore, the processor may be configured to create at least one index snapshot based on the stored set of resiliency snapshots through a clone API after a second predefined time period, wherein the at least one index snapshot is a reference to the stored set of resiliency snapshots. Also, the processor may be configured to mount the at least one index snapshot onto an archival search engine cluster using a mount option, wherein the archival search engine cluster comprises backup nodes associated with a storage system.

In accordance with an exemplary embodiment, the at least one data source of the real-time data stream comprises at least one of an IoT device, an online service, a sensor array, and a financial transactional system.

In accordance with an exemplary embodiment, the set of nodes comprises at least one or a combination of archival data nodes and active data nodes.

In accordance with an exemplary embodiment, the processor may be further configured to transfer the set of resiliency snapshots to a resiliency snapshot repository, wherein the resiliency snapshot repository being hosted on a cloud storage container or a distributed file storage.

In accordance with an exemplary embodiment, the mount option enables a partial mount of said index snapshots, enabling selective data retrieval, and wherein the storage system is hosted at least on one of a cloud storage container or a distributed file storage.

In accordance with an exemplary embodiment, the processor may be further configured receive an asynchronous search engine request comprising a search query for a document referenced in the at least one index snapshot, wherein the asynchronous search engine request being processed by the search engine archive cluster.

In accordance with an exemplary embodiment, the processor may be further configured to scan a localized cache associated with the archival search engine cluster for the queried document. Based on determining by the processor that the queried document is not available in the local cache, search the at least one index snapshot to search for the queried document based on metadata associated with the at least one index. Retrieving the queried document. Display a response through an API, wherein the response comprises the queried document retrieved from the at least one index snapshot or the localized cache, or an error message indicating failure to locate the queried document.

In accordance with an exemplary embodiment, the processor may be further configured to store metadata associated with the at least one index snapshot in the localized cache to facilitate subsequent searched, wherein the metadata comprises information about structure and content of the at least one index snapshot.

In accordance with an exemplary embodiment, the first predefined time period and the second predefined time period are dynamically adjustable based on any or a combination of system load or data volume.

According to yet another aspect, a non-transitory computer-readable storage medium storing instructions for efficient data archiving in a distributed search and analytics environment is disclosed. The instructions include executable code which, when executed by a processor, may cause the processor to ingest a real-time data stream from at least one data source; segment the ingested data stream into at least one segment and storing each of the at least one segment across a set of nodes in at least one search engine cluster; capture a set of resiliency snapshots of the at least one segment and storing the captured set of resiliency snapshots of the at least one segment within the at least one search engine cluster after a first predefined time period; create at least one index snapshot based on the stored set of resiliency snapshots through a clone Application Programming Interface (API) after a second predefined time period, wherein the at least one index snapshot is a reference to the stored set of resiliency snapshots; and mount the at least one index snapshot onto an archival search engine cluster using a mount option, wherein the archival cluster comprises backup nodes associated with a storage system.

In accordance with an exemplary embodiment, the at least one data source of the real-time data stream comprises at least one of an IoT device, an online service, a sensor array, and a financial transactional system.

In accordance with an exemplary embodiment, the set of nodes comprises at least one or a combination of archival data nodes and active data nodes.

In accordance with an exemplary embodiment, the executable code, when executed further causes the processor to transfer the set of resiliency snapshots to a resiliency snapshot repository, wherein the resiliency snapshot repository being hosted on a cloud storage container or a distributed file storage.

In accordance with an exemplary embodiment, the mount option enables a partial mount of said index snapshots, enabling selective data retrieval, and wherein the storage system is hosted at least on one of a cloud storage container or a distributed file storage.

In accordance with an exemplary embodiment, the executable code, when executed further causes the processor to receive an asynchronous search engine request comprising a search query for a document referenced in the at least one index snapshot, wherein the asynchronous search engine request being processed by the search engine archive cluster.

In accordance with an exemplary embodiment, the executable code, when executed further causes the processor to scan a localized cache associated with the archival search engine cluster for the queried document. Based on determining by the processor that the queried document is not available in the local cache, search the at least one index snapshot to search for the queried document based on metadata associated with the at least one index. Retrieving the queried document. Display a response through an API, wherein the response comprises the queried document retrieved from the at least one index snapshot or the localized cache, or an error message indicating failure to locate the queried document.

In accordance with an exemplary embodiment, the executable code, when executed further causes the processor to store metadata associated with the at least one index snapshot in the localized cache to facilitate subsequent searched, wherein the metadata comprises information about structure and content of the at least one index snapshot.

In accordance with an exemplary embodiment, the first predefined time period and the second predefined time period are dynamically adjustable based on any or a combination of system load or data volume.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

FIG. 4 illustrates an exemplary method flow diagram for data archiving and retrieval in a distributed search and analytics environment, in accordance with an exemplary embodiment.

DETAILED DESCRIPTION

Figure 1:
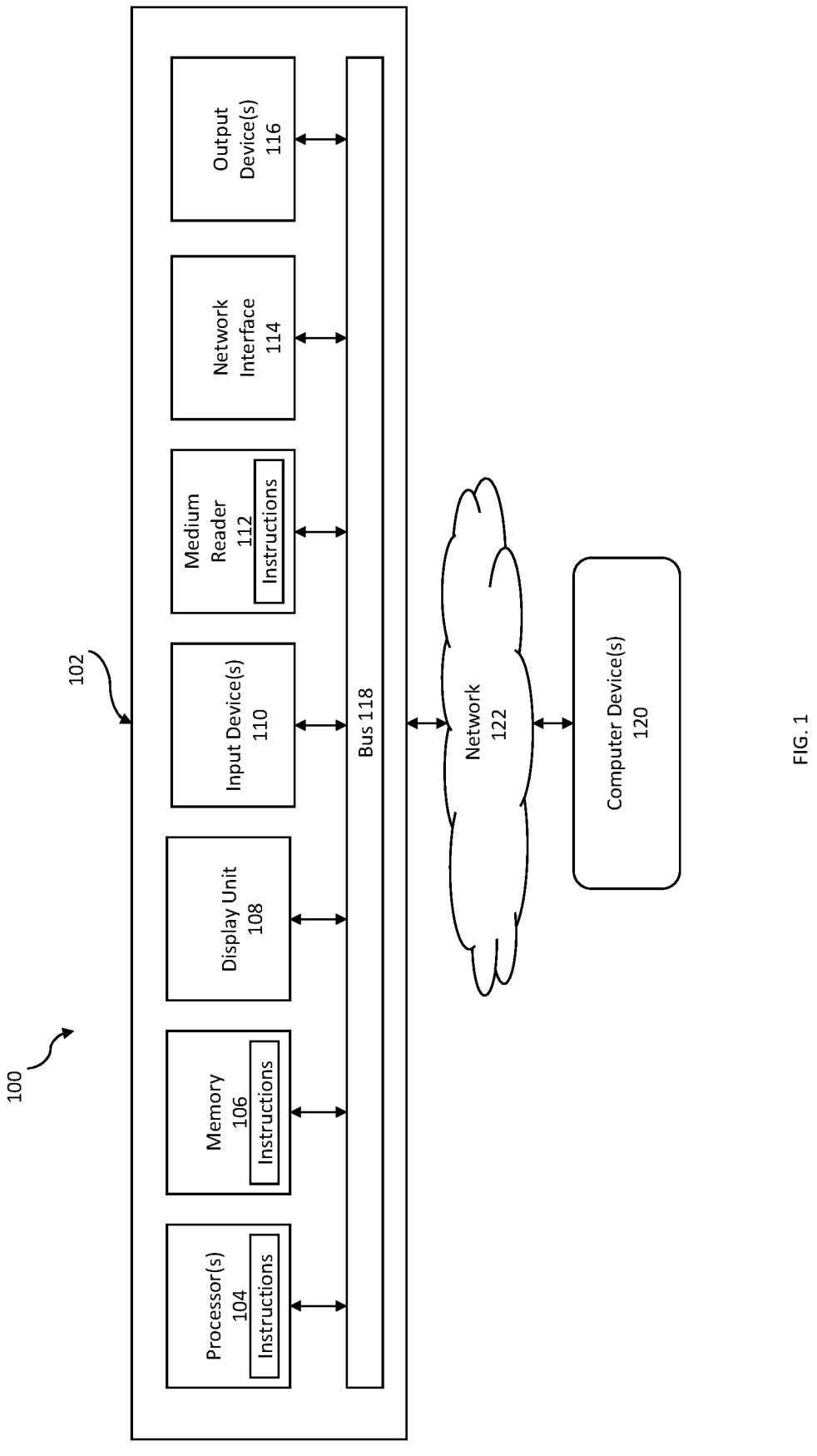
FIG. 1 illustrates an exemplary computer system for data archiving and retrieval in a distributed search and analytics environment in accordance with an exemplary embodiment.

Exemplary embodiments now will be described with reference to the accompanying drawings. The example embodiments may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

The term "distributed file storage" herein may refer to a storage architecture in which data is spread across multiple physical or virtual storage devices, often located at different geographical locations. Generally, in distributed file storage, files are divided into smaller chunks and stored across a network of interconnected nodes. Each node then holds a portion of the data, and together, they provide a unified file system that can be accessed by users and applications.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent, however, that the invention may be practiced without these specific details and features.

Through one or more of its various aspects, embodiments, and/or specific features or sub-components of the present disclosure, are intended to bring out one or more of the advantages as specifically described above and noted below.

The examples may also be embodied as one or more non-transitory computer-readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the above-mentioned limitations, the present disclosure provides a method and a system for archiving, storage, and retrieval of data in a distributed search and analytics environment.

Initially, the system is configured to ingest real-time data streams from a variety of sources. For example, the data stream may include payment events data. In another example, the data stream may include medical records. For example, the at least one data source may represent any location, system, or process that provides raw or structured data for analysis, processing, or utilization. In addition, the system is configured to store the data stream as at least one segment in a set of nodes in at least one search engine cluster. The system is further configured to segment the ingested data across nodes in a search engine cluster and creates a structured approach to data management, enhancing both storage and retrieval capabilities. Further, the system is further configured to capture resiliency snapshots and generate index snapshots, which ensures data integrity and facilitates quick retrieval. The dual-snapshot approach resolves the limitations of resilient storage and efficient retrieval highlighted in existing solutions. The use of a clone API for generating index snapshots adds to the process's efficiency, further enhancing data management capabilities. The system is further configured to mount the index snapshots onto an archival search engine cluster that integrates the archival and retrieval processes seamlessly. The integration of the archival and retrieval processes facilitates in enabling easy and efficient retrieval of archived data in real-time scenarios. The system is further configured to partial mount of index snapshots, enabling selective data retrieval, allowing for more resource-efficient operations and quicker access to relevant data. Further, the system is configured to handle asynchronous search engine requests and employing a localized cache for quicker access to frequently requested data to not only speed up data retrieval but also maintain system efficiency, aligning with the identified need for quick and reliable data access in the prior art.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, computer system 102 may include or be included within, any one or more computers, servers, systems, communication networks, or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, "search engine" refers to an open-source search and analytics engine designed for storing, searching, and analyzing large volumes of data quickly and in real time. Generally, the search engine is used for applications that require full-text search, structured and unstructured data analysis, and complex querying capabilities.

As used herein, "search engine cluster" refers to a collection of interconnected search engine nodes working together to store, manage, and process data. search engine clusters provide the foundation for scalability, fault tolerance, and high availability.

As used herein, "nodes" represent individual instances of a search engine running on separate machines or virtual environments. In addition, each node may contribute to the capabilities of the search engine cluster by storing data, handling queries, and participating in distributed operations. Further, nodes can be added or removed to scale the search engine cluster.

As used herein, "shards" represent fundamental units that the search engine uses to distribute and manage data across the nodes in a cluster (e.g., search engine cluster). More specifically, the search engine breaks each index into smaller units called shards to achieve horizontal scalability and efficient parallel processing.

As used herein, "segments" represent smaller subsets of a shard's data that the search engine uses internally for efficient data management and retrieval. For example, when data is indexed, data is initially written to a memory buffer. Once the memory buffer is full, the data is flushed to the disk as a segment. Over time, as more data is indexed, multiple segments accumulate for each shard.

As illustrated in FIG. 1, computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, and unsecured and/or unencrypted. As regards the present disclosure, the computer memory 106 may comprise any combination of memories or single storage.

The computer system 102 may further include a Display Unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, computer system 102 may include any additional devices, components, parts, peripherals, hardware, software, or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for data archiving, storage, and retrieval in a distributed search and analytics environment.

Figure 2:
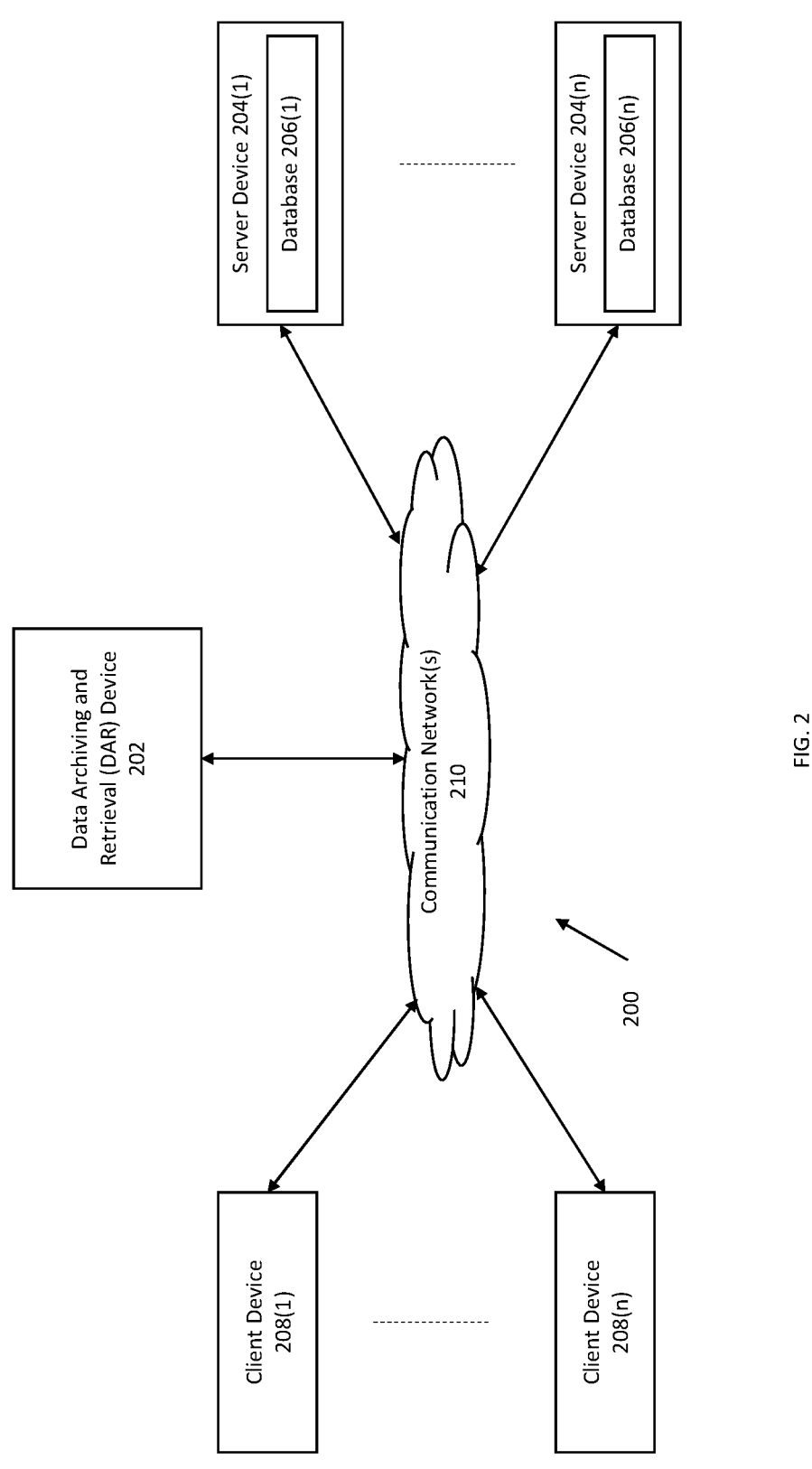
FIG. 2 illustrates an exemplary diagram of a network environment for data archiving and retrieval in a distributed search and analytics environment in accordance with an exemplary embodiment.

Referring to FIG. 2, a schematic of an exemplary network environment 200 for implementing a method efficient data archiving and retrieval in a distributed search and analytics environment is illustrated. In an exemplary embodiment, the method is executable on any networked computer platform, such as, for example, a personal computer (PC).

The method efficient data archiving and retrieval in a distributed search and analytics environment may be implemented by a data archiving and retrieval (DAR) device 202. The DAR device 202 may be the same or similar to the computer system 102 as described with respect to FIG. 1. The DAR device 202 may store one or more applications that can include executable instructions that, when executed by the DAR device 202, cause the DAR device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s), that may be managed in a cloud-based computing environment. Also, the application(s), and even the DAR device 202 itself, may be located in the virtual server(s) running in a cloud-based computing environment rather than being tied to one or more specific physical network computing devices. Also, the application(s) may be running in one or more virtual machines (VMs) executing on the DAR device 202. Additionally, in one or more embodiments of this technology, virtual machine(s) running on the DAR device 202 may be managed or supervised by a hypervisor.

In the network environment 200 of FIG. 2, the DAR device 202 is coupled to a plurality of server devices **204(1)-204(*n*) that hosts a plurality of databases or repositories 206(1)-206(*n*), and also to a plurality of client devices 208(1)-208(*n*) via a communication network(s) 210. A communication interface of the DAR device 202, such as the network interface 114 of the computer system 102 of FIG. 1, operatively couples and communicates between the DAR device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DAR device 202, the server devices **204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and the DAR device 202** that efficiently implements a method for archiving data in a distributed search and analytics environment.

By way of example only, the communication network(s) 210 may include local area network(s) (LAN(s)) or wide area network(s) (WAN(s)) and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Networks (PSTNs), Ethernet-based Packet Data Networks (PDNs), combinations thereof, and the like.

The DAR device 202 may be a standalone device or integrated with one or more other devices or apparatuses, such as one or more of the server devices **204(1)-204(*n*), for example. In one particular example, the DAR device 202 may include or be hosted by one of the server devices 204(1)-204(*n*), and other arrangements are also possible. Moreover, one or more of the devices of the DAR device 202** may be in the same or a different communication network including one or more public, private, or cloud-based networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. In an example, the server devices 204(1)-204(*n*) may process requests received from the DAR device 202 via the communication network(s) 210** according to Hypertext Transfer Protocol (HTTP) based and/or JavaScript Object Notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) host the databases or repositories 206(1)-206(*n*)** that are configured to store data that relates to data archiving, including documents and metadata.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) is not limited to a particular configuration. Thus, the server devices 204(1)-204(*n*) may contain a plurality of network computing devices that operate using a controller/agent approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the DAR device 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary embodiment, at least one client device 208** is a wireless mobile communication device, e.g., a smartphone.

The client devices 208(1)-208(*n*) may run interface applications, such as standard web browsers or standalone client applications, which may provide an interface to communicate with the DAR device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the DAR device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DAR device 202, the server devices 204(1)-204(*n*), or the client devices 208(1)-208(*n*), for example, may be configured to operate as virtual instances on the same physical machine. In other words, one or more of the DAR device 202, the server devices 204(1)-204(*n*), or the client devices 208(1)-208(*n*) may operate on the same physical device rather than as separate devices communicating through a communication network(s) 210. Additionally, there may be more or fewer DAR devices 202, server devices 204(1)-204(*n*), or client devices 208(1)-208 (*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on a computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
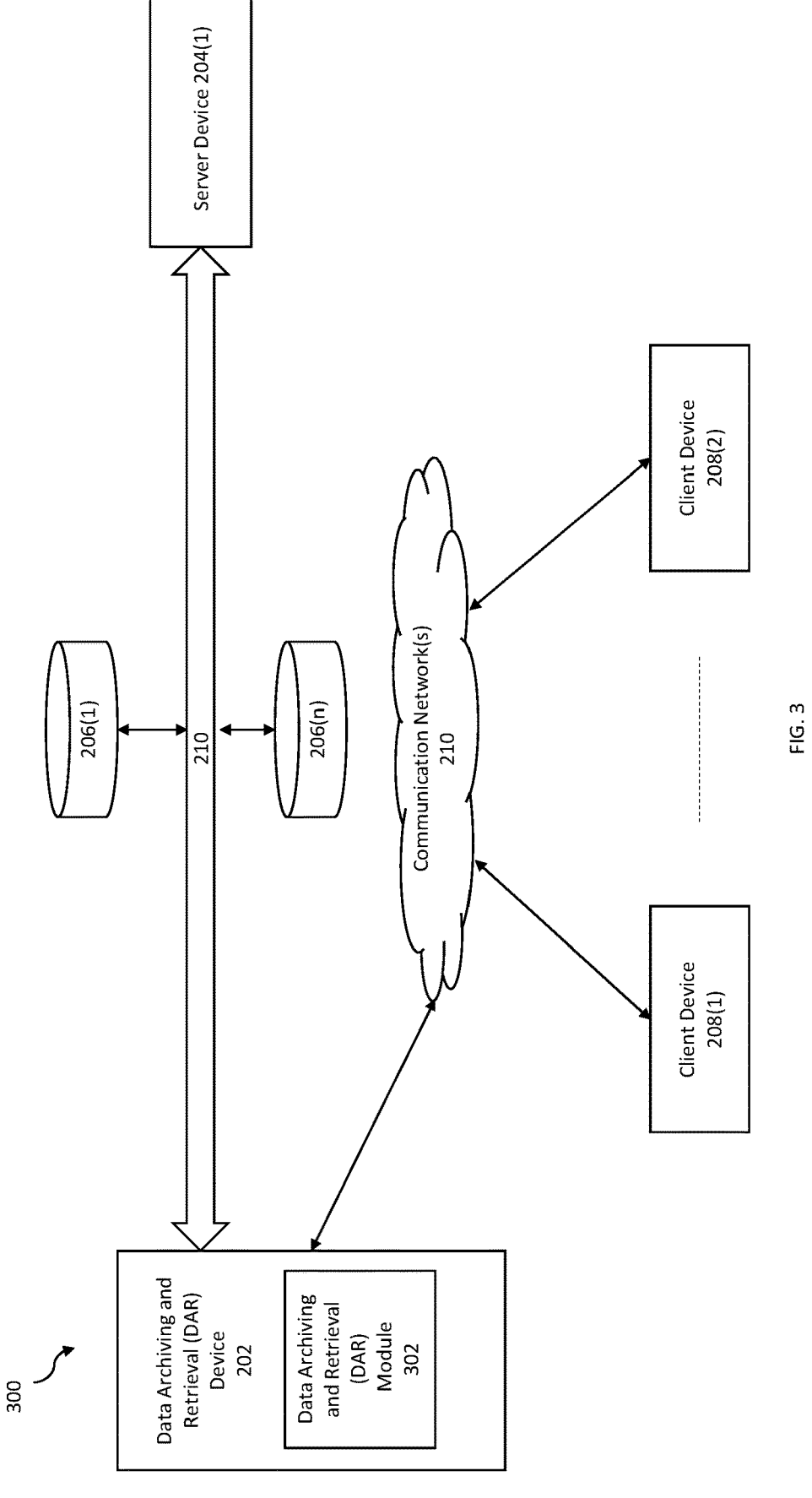
FIG. 3 illustrates an exemplary system for implementing a method for data archiving and retrieval in a distributed search and analytics environment, in accordance with an exemplary embodiment.

FIG. 3 illustrates an exemplary system for implementing a method efficient data archiving and retrieval in a distributed search and analytics environment, in accordance with an exemplary embodiment. As illustrated in FIG. 3, according to exemplary embodiments, the system 300 may comprise a DAR device 202 including a data archiving and retrieval (DAR) module 302 that may be connected to a server device 204(1) and one or more repository from the repositories 206(1) . . . 206(*n*) via a communication network 210, but the disclosure is not limited thereto.

The DAR device 202 is described and shown in FIG. 3 as including the DAR module 302, although it may include other rules, policies, modules, databases, or applications, for example. As will be described below, the DAR module 302 is configured to implement a method for efficient data archiving and retrieval in a distributed search and analytics environment.

An exemplary system 300 for implementing a mechanism efficient data archiving and retrieval in a distributed search and analytics environment of FIG. 2 is shown as being executed in FIG. 3. Specifically, a first client device 208(1) and a second client device 208(2) are illustrated as being in communication with the DAR device 202. In this regard, the first client device 208(1) and the second client device 208(2) may be "clients" of the DAR device 202 and are described herein as such. Nevertheless, it is to be known and understood that the first client device 208(1) and/or the second client device 208(2) need not necessarily be "clients" of the DAR device 202, or any entity described in association therewith herein. Any additional or alternative relationship may exist between either or both of the first client device 208(1) and the second client device 208(2) and the DAR device 202, or no relationship may exist.

Further, the DAR device 202 is illustrated as being able to access the one or more repositories 206(1) . . . 206(*n*). The DAR module 302 may be configured to access these repositories/databases for implementing the method for efficient data archiving and retrieval in a distributed search and analytics environment.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the DAR device 202 via broadband or a cellular communication. Of course, these embodiments are merely exemplary and are not limiting or exhaustive.

Referring to FIG. 4, an exemplary method 400 is shown efficient data archiving and retrieval in a distributed search and analytics environment, in accordance with an exemplary embodiment of the present disclosure. The method is implemented by at least one processor. As shown in FIG. 4, the method begins at step S402.

At step S402, the method includes ingesting, by the at least one processor 104, a real-time data stream from at least one data source.

The data stream ingestion process involves receipt and incorporation of a real-time data stream. The at least one data source of this real-time data stream may include for example IoT devices, online services, sensor arrays, or financial transaction systems. The real-time data stream may comprise continuous or semi-continuous flows of data that may be ingested in real-time or near real-time. The data stream can contain various types of data, including but not limited to, textual information, numerical data, binary blobs, or even multi-media such as video or audio data. The structure of the data stream can include a highly structured JSON object to a less structured collection of data points.

In an embodiment, upon receipt, the real-time data stream may undergo an optional series of validation and preprocessing steps to ensure data integrity and suitability for further processing. The processing steps can include data type validation, range checks, or data normalization procedures. If the ingested data stream fails any of these validation steps, the system might trigger alerts or initiate error-handling protocols. Data from the ingested real-time data stream may be temporarily buffered in volatile or non-volatile memory. The buffering allows for more efficient handling of data spikes and assists in the management of system resources. In an embodiment, data throttling mechanisms may be activated to control the rate of data ingestion, particularly useful during periods of high-volume data flow or limited system resources and the like. After successful validation and optional buffering, the data in the real-time data stream may be segmented into manageable chunks. Each of these segments may further be associated with a unique identifier or index for easy retrieval and analytics at a later stage.

Examples of the at least one data source include a database, a file system, an external API, a web service, or any other mechanism that provides access to the data stream. In an embodiment, the data stream is financial data. Examples of the data stream may also include medical data, educational data, advertisement data, and the like. In an example, the data stream is payment events data. In another example, the data stream is payment data services (PDS) data. The term "Payment events data" herein refers to information about individual events or actions that occur during the process of a financial transaction, specifically a payment. The payment events could include various stages related to payment processing, such as initiation, authorization, validation, settlement, completion, and the like.

For example, the payment events data can include timestamps of when each event (e.g., payment) occurred, identifiers of the parties involved (e.g., payer, payee, financial institutions, etc.), transaction amounts, currencies, conversion rates, statuses of each event (e.g., pending, authorized, declined, settled), reference numbers, authorization codes, and other tracking information. The payment events data can also include payment methods used (e.g., credit card, bank transfer, digital wallet, etc.).

The term "payment data services" refers to specialized services that handle and provide access to various types of payment-related data. The PDS are generally offered by financial companies, payment processors, and financial institutions to help businesses and individuals manage payments effectively. For example, the PDS include payment processing, transaction tracking, fraud detection and prevention, analytics and reporting, reconciliation, subscription, and recurring payments, and the like. The data associated with PDS may be referred to as PDS data. For example, the data stream may represent retention data that needs to be stored for data archiving purposes.

In an example, in a financial trading environment, a system ingests real-time data streams from multiple financial markets. This data includes real-time stock quotes, commodities prices, and foreign exchange rates. The system initially validates and potentially transforms this incoming data, standardizing currency values or filtering out anomalies. This cleansed, real-time financial data is then immediately made available for trading algorithms and analytics tools. The speed and accuracy of data ingestion are crucial in this setting, as delays can materially affect trading outcomes.

At step S404, the method includes segmenting, by the at least one processor 104, the ingested data stream into at least one segment and storing each of the at least one segment across a set of nodes in at least one search engine cluster.

In an example, the data stream may be stored in more than one search engine cluster. The "nodes" herein may represent individual instances of a search engine running on separate machines or virtual environments within a search engine cluster. Each node may contribute to the processing, indexing, and storage of data. Search engine manages the data (e.g., the data stream) in smaller units called segments. Each segment holds a subset of the indexed data. In addition, segments are read-only and are used for efficient search and retrieval. In general, the index includes one or more shards.

In addition, each shard may include various segments (e.g., the at least one segment). Thus, each segment is an inverted index. Moreover, each segment is immutable.

During segmentation, the continuous or semi-continuous flow of the ingested data stream may get divided into smaller, manageable segments. The segments can serve as the basic units for subsequent storage, retrieval, and analytics tasks. Each segment created during the segmentation process can possess a set of attributes or metadata. The metadata can include, but is not limited only to, a unique segment identifier, a timestamp indicating the time of segment creation, and a summary of the data types or structures contained within the segment. The metadata enhances the segment's utility by providing contextual information necessary for effective data manipulation and interpretation.

Following the segmentation, the created segments undergo storage across a distributed network comprising multiple nodes. The distributed network exists within the at least one search engine cluster. By distributing each segment across multiple nodes, the system achieves both horizontal scalability and fault tolerance, ensuring that the data remains accessible and secure. The index facilitates quick and efficient data retrieval operations. It should be noted that each index may comprise one or multiple segments, allowing for complex and multifaceted data structures. Within the search engine cluster, each node may distinctly store the segments and the associated indices. The indexing and storage process ensures that each segment can be rapidly and accurately accessed when needed.

The term "search engine cluster" herein may represent a collection of interconnected nodes working together to store and manage data. search engine clusters ensure data distribution, scalability, and fault tolerance. In an embodiment, the set of nodes includes at least one of archival data nodes and active data nodes.

The term "active data nodes" herein may represent the nodes within the search engine cluster that actively participate in processing, indexing, and serving search queries. The active data nodes handle real-time data ingestion, updates, and searches, providing quick access to frequently accessed data. For example, the active data nodes handle the indexing load for time series data (e.g., the data stream) and hold the most recent, frequently accessed data. In an example, each active node has 64 GB RAM and 2 TB of SSD storage. In addition, RAM/Disk space ratio is 1:32.

The term "archival data nodes" herein may represent the nodes within the search engine cluster that are optimized for storing and accessing older or less frequently accessed data. The archival data nodes focus on long-term data retention and historical analysis rather than real-time operations. For example, the archival data nodes hold time series data (e.g., the data stream) that would be infrequently updated and less frequently queried. In an example, each archive node has 64 GB RAM and 4 TB of SSD storage. In addition, RAM/Disk space ratio is 1:64.

At step S406, the method includes capturing, by the at least one processor 104, a set of resiliency snapshots of the at least one segment and storing the captured set of resiliency snapshots of the at least one segment within the at least one search engine cluster after a first predefined time period.

The snapshot is a read-only copy of data at a specific point in time, enabling the at least one processor 104 to preserve the state of data in case of unexpected events like system failures or data corruption. The term "snapshot" herein may represent a point-in-time copy of the data within the search engine index. The set of resiliency snapshots captures the state of the data and its segments at that instant in time. The set of resiliency snapshots can be used for backup, recovery, archiving, and migration purposes. The first predefined time period can be set by an administrator as per requirement. The snapshots may be time stamped. The time stamps associated with each snapshot may provide temporal context, aiding in the determination of the state of data at specific intervals.

The frequency at which the set of resiliency snapshots is captured may be based on the first predefined time period. The first predefined time period can be configured based on various parameters such as system load, urgency of data backup, or specific business requirements. It would be appreciated by those skilled in the art that adherence to the first predefined time period ensures that the data state is consistently archived without overwhelming system resources. Once captured, the set of resiliency snapshots is stored within the at least one search engine. Storage in the search engine allows for rapid retrieval of historical data, as the search engine may be optimized for fast data lookup operations. In an embodiment, within the search engine, hierarchical storage mechanisms can be employed to optimize the speed and efficiency of snapshot retrieval. The snapshots can be categorized based on their temporal attributes, data types, or other specific criteria. The categories can then be organized into hierarchical structures, facilitating quicker, more efficient searches.

It would be appreciated by those skilled in the art that by maintaining an ongoing record of data states at various points in time, the system facilitates analysts and administrators to trace back events, detect anomalies, and understand data evolution. For example, capturing the snapshots represents making the copy of the at least one segment of the index of the at least one index and storing the copy in a repository (e.g., the resiliency snapshot repository). In addition, each snapshot is incremental in nature. For example, a snapshot taken at time T2 will also include the data in the snapshot taken at time T1 along with the changes or updates that happened during T1 and T2, where T2 occurred later in time than T1.

For example, the snapshots may include a snapshot S1, a snapshot S2, and a snapshot S3. The snapshot S1 is taken at time T1, the snapshot S2 is taken at time T2, and the snapshot S3 is taken at time T3, where T2 occurred after T1 and T3 occurred after T2. During snapshot S1, a segment G1 was written to a search engine cluster ES1, therefore the snapshot S1 includes the copy of the segment G1. Next, segments G2 and G3 were written to the search engine cluster ES1. Therefore, during snapshot S2, the snapshot S2 includes the segments G2 and G3 along with the segment G1 that was already captured in the snapshot S1. Thus, it is noted that each new snapshot has links with the earlier segments. In addition, since segments are immutable, only new segments created since last snapshot needs to be copied to the repository (e.g., resiliency snapshot repository). Therefore, the data copy is incremental; however, each snapshot can retrieve all the data till that point. In an embodiment, capturing snapshots can be automated using Snapshot Lifecycle Management (SLM). Generally, SLM is a feature in the search engine that provides automated management of data snapshots. Additionally, SLM simplifies the process of managing and maintaining snapshots by automating various tasks based on defined policies.

For example, the first predefined time period can include daily, weekly, monthly, or custom intervals based on the requirement. In an embodiment, if the first predefined time period is set as 12 hours. Therefore, the snapshot of the at least one segment of the stored data stream is captured every 12 hours.

The set of resiliency snapshots, distinct from a regular snapshot, encapsulates not only data but also metadata, configurations, and other pertinent attributes that define the state of an index. The set of resiliency snapshots serves as a comprehensive data point for backup, recovery, and resilience against unexpected system interruptions, such as hardware failures or data corruption events. The capturing of the set of resiliency snapshots is not a continuous process but occurs periodically after the first predefined time period. The first predefined time period can be adjusted according to various operational parameters, such as data load, system performance metrics, or operational requirements. Thus, the system can be configured to adapt its backup and recovery operations to meet changing needs without straining resources.

Upon successful capture, each resiliency snapshot of the set of resiliency snapshots may be stored within the search engine cluster, more specifically among the set of nodes that make up or form part of the search engine cluster. Storing the set of resiliency snapshots within the search engine cluster ensures that the data and its accompanying state remain co-located with the active data, thereby facilitating quicker recovery and minimal downtime in case of failure events. The set of resiliency snapshots are not isolated entities but are systematically associated with corresponding indices within the search engine cluster. Each index is typically a collection of segments, and each segment may contain multiple data types. By associating set of resiliency snapshots with specific indices, the system enhances data traceability and simplifies the restoration process, as each snapshot can be directly mapped back to its originating index.

The utility of the set of resiliency snapshots goes beyond mere archival purposes. By capturing a holistic view of an index, including its data, settings, and mappings, the set of resiliency snapshots provide a robust foundation for disaster recovery plans. They also enable precise data audits and facilitate advanced analytics by providing a more complex and nuanced picture of data at different points in time.

In an embodiment, the set of resiliency snapshots captures the current state of the at least one index. The current state includes data, mappings, settings, and combinations thereof. The term "current state" herein may represent the specific configuration, data, mappings, and settings that exist in the indexes at the time the set of resiliency snapshots is captured.

For example, mappings may define the structure of the data within the index of the at least one index. Further, mappings may specify the data types of fields, how they should be indexed, and other characteristics that can help with efficient querying and analysis. For example, settings may include various configurations that affect the behavior of the index of the at least one index, such as shard settings, replication settings, and the like.

At step S408, the method includes creating, by the at least one processor 104, at least one index snapshot based on the stored set of resiliency snapshots through a clone Application Programming Interface (API) after a second predefined time period, wherein the at least one index snapshot is a reference to the stored set of resiliency snapshots.

The API serves as an intermediary that facilitates the process of creating at least one index snapshot based on the stored set of resiliency snapshots. The at least one index snapshot functions as reference to their respective resiliency snapshots. This reference-based architecture allows for lower consumption of storage resources, as well as more efficient data management because the at least one index snapshot does not require duplication of the actual data contained in the stored set of resiliency snapshot.

Storage of the at least one index snapshot considers factors such as data integrity, accessibility, and optimal resource utilization. Since the at least one index snapshot may essentially reference the stored set of resiliency snapshots, they share the same storage locations within the search engine cluster, thus enhancing data coherency and reducing the time needed for data retrieval in recovery scenarios. Additionally, because each index snapshot of the at least one index snapshot may contain not just the data but also metadata and configurations, the integrity of the system state is preserved even in situations requiring rollback or recovery actions.

The role of the clone API in this step is not merely functional but also enhances efficiency and operational performance. By automating the index snapshot creation process and integrating with the set of resiliency snapshots generation, the clone API enables streamlined backup and recovery processes. Its programmable nature allows for customization based on specific operational needs, including conditions under which index snapshots should be generated, thereby offering a high degree of flexibility and control.

At step S412, the method includes mounting, by the at least one processor 104, the at least one index snapshot onto an archival search engine cluster using a mount option, wherein the archival search engine cluster comprises backup nodes associated with a storage system.

The mounting at least one index snapshot onto a designated archival search engine cluster may be conducted using a specialized software commands, commonly referred to as mount options. The mount options serve to facilitate the process of transferring the index snapshot to a location within the archival search engine cluster. The archival search engine cluster itself may be composed of backup nodes, which are dedicated storage components configured to work in tandem with an existing storage system.

Mount options, an integral part of this step, are employed to ensure that the mounting operation adheres to predefined protocols and security measures. These software commands are crafted to maintain the integrity of the data during the transfer process. Furthermore, these mount options may incorporate additional settings, including, but not limited to, read-only status, encryption, and compression algorithms, each serving to enhance data security, integrity, and optimized storage utilization.

The backup nodes within the archival search engine cluster hold significance in this step. Each of these nodes is intricately associated with a broader storage system, thereby functioning as a sub-component of that system. These backup nodes are specially configured to store data in a manner that facilitates quick retrieval, scalability, and robustness against potential system failures or data corruption incidents. They often employ redundancy and error-checking mechanisms to ensure a high degree of reliability and data integrity.

The mounting of the at least one index snapshot onto the archival cluster occurs in a synchronized fashion, adhering to a specified schedule or triggering conditions. These conditions could range from time-based intervals to system events such as low storage space or the successful completion of data validation processes. The synchronized manner of this operation ensures that the most up-to-date version of the at least one index snapshot is preserved within the archival search engine cluster, thus maintaining data consistency and reliability.

The archival cluster plays a pivotal role in the overarching data lifecycle management strategy. By serving as a repository for index snapshots, the archival cluster enables long-term data retention, facilitates compliance with data governance regulations, and provides a resource for historical data analysis and audit trails.

Further, the method includes receiving, by at least one processor, an async search engine request comprising a search query for a document referenced in the at least one index snapshot. In an embodiment, the async search engine request is received at the search engine archive cluster. The term "async search engine request" herein represents that the request for search engine operations is executed asynchronously, meaning that the processing of the request does not block the requester and the results are returned when they become available. In an embodiment, the at least one processor allows the searching of the at least one index snapshot in a similar manner as the at least one index can be searched.

Upon receiving the async search engine request, the method includes searching, by at least one processor, for the queried document in a local cache associated with the search engine archive cluster. In particular, the partially mounted at least one index utilize the local cache. The local cache is used as a temporary storage area that stores frequently used or recently accessed data for faster retrieval. For example, the local cache is utilized to hold the documents that have been searched or accessed recently.

Based on determining by the at least one processor that the queried document is not available in the local cache, the method includes accessing, by at least one processor, the at least one index snapshot to search for the queried document. The at least one index snapshot acts as a reference or pointer to the set of resiliency snapshots, where the queried document is stored.

Further, the method includes accessing, by at least one processor, metadata associated with the at least one index snapshot to retrieve the queried document. The "metadata" herein may provide additional information about the data stored in the at least one index. Examples of the metadata include details about the structure, mappings, and other attributes. In an example, the at least one processor may access the metadata associated with the at least one index snapshot to retrieve information that may help to identify the location or specific characteristics (or attributes) associated with the queried document within the at least one index snapshot.

Furthermore, the method includes displaying, by at least one processor, a reply in response to the async search engine request on a user device with facilitation of an API. The response includes at least one of the queried document retrieved from the at least one index snapshot or the local cache, or an error message. For example, in case there is an issue or error during the retrieval process, or the queried document is not found, the response may include an error message instead of the requested or queried document.

Moreover, the method includes storing, by at least one processor, metadata associated with the at least one index snapshot in the local cache. In one example, the local cache is associated with the search engine archive cluster. The metadata includes information about structure and content of the at least one index snapshot.

The above-mentioned method steps are performed to handle various async search engine requests.

The method also includes deleting, by at least one processor, the at least one index snapshot from the at least one search engine cluster post mounting of the at least one index snapshot onto the search engine archive cluster. For example, the data stream is migrated from the active data nodes or the archival data nodes to the backup nodes, thus reducing the requirement of the shard size and overall volume that needs to be managed by the at least one search engine cluster.

Figure 5:
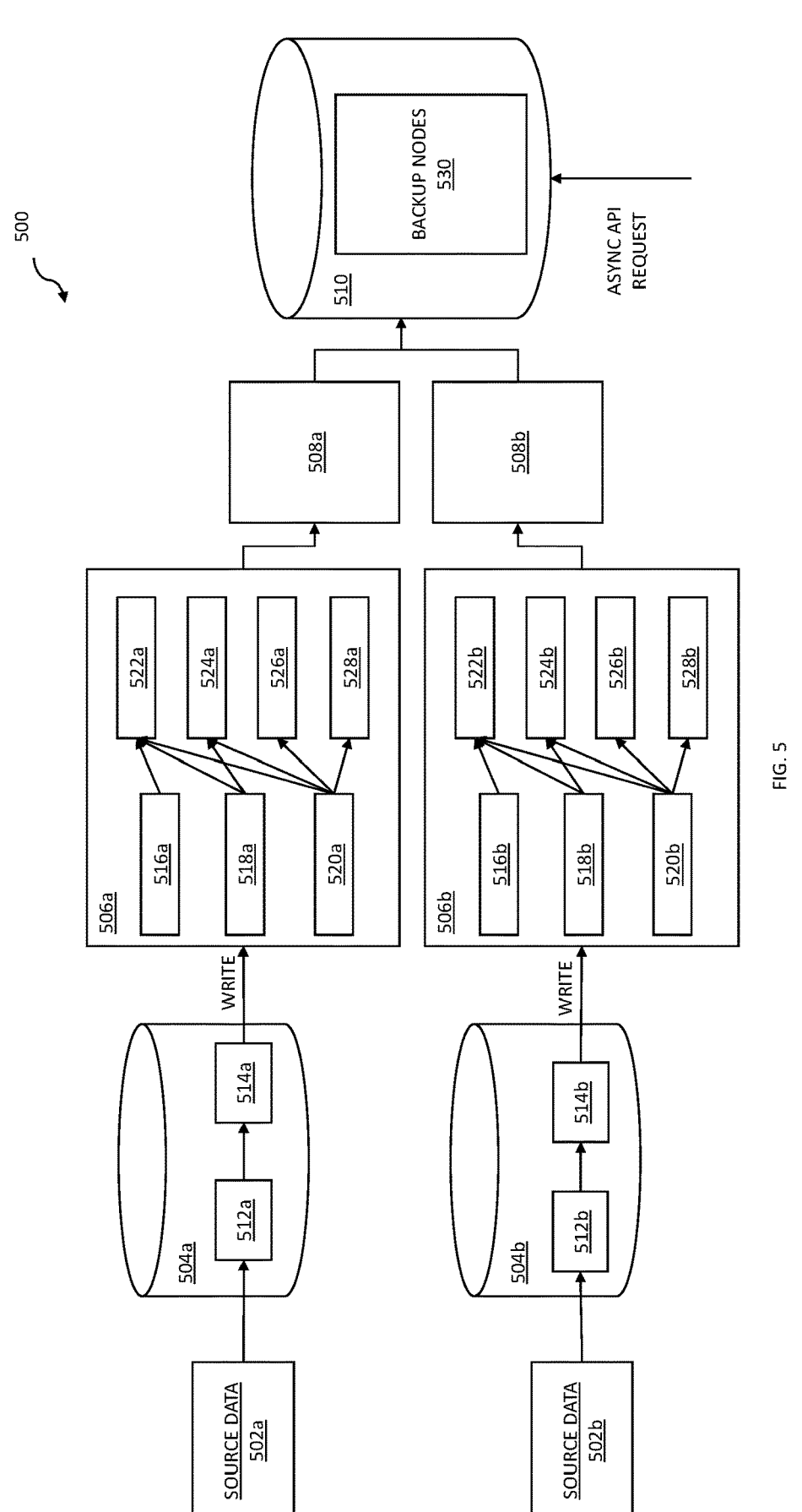
FIG. 5 illustrates a block diagram of an environment for data archiving and retrieval in a distributed search and analytics environment, in accordance with an exemplary embodiment.

FIG. 5 illustrates a block diagram of an environment 500 for efficient data archiving and retrieval in a distributed search and analytics environment, in accordance with an exemplary embodiment. As illustrated in FIG. 5, the environment 500 is illustrated with entities including, for example, a data stream 502a, a data stream 502b, a search engine cluster 504a, a search engine cluster 504b, a storage container 506a, a storage container 506b, an index snapshot 508a, an index snapshot 508b, and a search engine archive cluster 510.

The data stream 502a is identical to the data stream 502b. In an example, both the data stream 502a and the data stream 502b indicates ingestion of real-time financial data. For example, the data stream 502a indicates payment data services (PDS) data. In another example, the data stream 502b includes payment events data. In one example, both the data stream 502a and the data stream 502b represents retention data, meaning that the payment data needs to be retained or stored.

In an example, the data stream 502a is generated at time interval T1 and the data stream 502b is generated after the period of time (e.g., one month). Thus, the data stream 502b represents the retention data that is generated at a time interval T2, wherein T2 is after one month from the time interval T1.

The data stream 502a is then stored as at least one segment in a set of nodes in the search engine cluster 504a. The set of nodes includes active data nodes 512a and archival data nodes 514a. The active data nodes 512a handle the indexing load for time-series data (e.g., the data stream 502a) and store the most recent, frequently accessed data. On the other hand, the archival data node 514a holds time series data (e.g., the data stream 502a) that would be infrequently updated and less frequently queried.

The search engine cluster 504a includes the active data nodes 512a and the archival data nodes 514a. In particular, the data stream 502a is stored as the at least one segment in the active data nodes 512a and the archival data nodes 514a in the search engine cluster 504a.

In an example, the at least one segment are then written to the storage container 506a. With reference to FIG. 5, the at least one segment may include a segment 522a, a segment 524a, a segment 526a, and a segment 528a. Next, the snapshots are captured for the at least one segment (e.g., the segment 522a, the segment 524a, the segment 526a, and the segment 528a) at a first predefined time period (e.g., after every 12 hours).

For example, at a time interval T1, a snapshot 516a is captured for the segment 522a as only the segment 522a is written to the storage container 506a. Next, at time interval T2, a snapshot 518a is captured for the segment 522a and the segment 524a as both the segment 522a and the segment 524a are written to the storage container 506a till time T2. Thereafter, at time interval T3, a snapshot 520a is captured for the segment 522a, the segment 524a, the segment 526a, and the segment 268a as the segments 522a-528a are written to the storage container 506a till time T3.

Further, a set of resiliency snapshots is captured for the at least one index stored in the storage container 506a after a period of time (e.g., monthly). In particular, after every month, the set of resiliency snapshots is captured for the at least one index written to the storage container 506a. For example, a resiliency snapshot R1 is generated after a month M1.

Furthermore, the index snapshot 508a is created based on the resiliency snapshot R1. Moreover, the index snapshot 508a is mounted onto the search engine archive cluster 510 with facilitation of a mount option (e.g., partial mount). The index snapshot 508a is mounted in backup nodes 530 in a storage system (e.g., cloud storage).

The "backup nodes" herein represents the nodes that are utilized for holding data that is rarely accessed and never updated. The backup nodes supports both full mount and partial mount of the at least one index. However, in the case of partial mounting, the data is stored only in the storage container (e.g., cloud storage) and not on a disk storage.

For example, the data stream 502a represents the retention data for the month M1. The data stream 502a for the month M1 is written to the backup nodes 530. After passing of the period of time (e.g., the month M1), the data stream is represented as the data stream 502b.

The data stream 502b is then stored as at least one segment in a set of nodes in the search engine cluster 504b. The set of nodes include active data nodes 512b and archival data nodes 514b. The active data nodes 512b handle the indexing load for time-series data (e.g., the data stream 502b) and stores the most recent, frequently accessed data. On the other hand, the archival data nodes 514b holds time series data (e.g., the data stream 502b) that would be infrequently updated and less frequently queried.

The search engine cluster 504b includes the active data nodes 512b and the archival data nodes 514b. In particular, the data stream 502b is stored as the at least one segment in the active data nodes 512b and the archival data nodes 514b in the search engine cluster 504b.

In an example, the at least one segment is then written to the storage container 506b. With reference to FIG. 5, the at least one segment may include a segment 522b, a segment 524b, a segment 526b, and a segment 528b. Next, the snapshots are captured for the at least one segment (e.g., the segment 522b, the segment 524b, the segment 526b, and the segment 528b) at a first predefined time period (e.g., after every 12 hours).

For example, at a time interval T3, a snapshot 516b is captured for the segment 522b as only the segment 522b is written to the storage container 506b. Next, at time interval T4, a snapshot 518b is captured for the segment 522b and the segment 524b as both the segment 522b and the segment 524b are written to the storage container 506b till time T4. Thereafter, at time interval T5, a snapshot 520b is captured for the segment 522b, the segment 524b, the segment 526b, and the segment 268b as the segments 522b-528b are written to the storage container 506b till time T5.

In an embodiment, a set of resiliency snapshots (e.g., resiliency snapshot R2) may be generated for the at least one index stored in the storage container 506b after a period of time (e.g., after the month M2). In particular, after every month, the set of resiliency snapshots is captured for the at least one index written to the storage container 506b within the previous month.

Furthermore, the index snapshot 508b is created based at least on the resiliency snapshot R2. Moreover, the index snapshot 508b is mounted onto the search engine archive cluster 510 with facilitation of a mount option (e.g., partial mount). The index snapshot 508b is mounted in the backup nodes 530 in a storage system (e.g., cloud storage).

Moreover, an exemplary user can utilize a user device (e.g., smartphone, laptop, desktop computer, tablet, phablet, etc.) to send an async search engine API request to the search engine archive cluster 510. Upon receiving the search engine request, the local cache associated with the search engine archive cluster 510 is initially searched to look for the queried document.

In case the queried document is found in the local cache, the queried document is returned as a response to the search engine request. In case the queried document is not found in the local cache, the at least one index snapshot (e.g., the index snapshot 508*a* and the index snapshot 508*b*) is searched for the queried document. In addition, metadata associated with the at least one index snapshot is accessed to retrieve the queried document.

The queried document is then displayed as a response on a display screen of the user device of the user. In case the queried document is not found in both the local cache and the at least one index snapshot, an error message is displayed on the display screen of the user device indicating that the queried document is not found.

Accordingly, with this technology, an optimized process for efficient data archiving, storage, and retrieval is disclosed. As evident from the above disclosure, the present solution provides significant technical advancement over the exciting solutions by providing a search engine archive cluster that stores the retention data in the form of backup nodes.

The present disclosure provides multiple advantages, such as data storage optimization along with a significant cost-benefit analysis, easier data sharing and migration, standardization of data warehousing, and easier data archiving, storage, and retrieval.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials, and embodiments, the present disclosure is not intended to be limited to the particulars disclosed; rather the present disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/ "computer-readable storage medium" shall also include any storage medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer implemented method for data archiving and retrieval in a distributed search and analytics environment, the method being implemented by at least one processor, the method comprising:

ingesting, by the at least one processor, a real-time data stream from at least one data source;

segmenting, by the at least one processor, the ingested data stream into at least one segment and storing each of the at least one segment across a set of nodes in at least one search engine cluster;

capturing, by the at least one processor, a set of resiliency snapshots of the at least one segment and storing the captured set of resiliency snapshots of the at least one segment within the at least one search engine cluster after a first predefined time period;

creating, by the at least one processor, at least one index snapshot based on the stored set of resiliency snapshots through a clone Application Programming Interface (API) after a second predefined time period, wherein the at least one index snapshot is a reference to the stored set of resiliency snapshots, wherein the set of resiliency snapshots captures a current state of the at least one index snapshot, and wherein the current state represents a specific configuration, data, mappings, and settings that exist in the at least one index snapshot at the time the set of resiliency snapshots is captured;

mounting, by the at least one processor, the at least one index snapshot onto an archival search engine cluster using a mount option, wherein the archival search engine cluster comprises backup nodes associated with a storage system; and deleting, by the at least one processor, the at least one index snapshot from the at least one search engine cluster after mounting onto the archival search engine cluster, wherein data associated with the at least one index snapshot is migrated from active or archival data nodes to the backup nodes, thereby reducing requirement of the shard size and overall volume that needs to be managed by the at least one search engine cluster.

2. The method as claimed in claim 1, wherein the at least one data source of the real-time data stream comprises at least one of an Internet of Things (IoT) device, an online service, a sensor array, and a financial transactional system.

3. The method as claimed in claim 1, wherein the set of nodes comprises at least one or a combination of archival data nodes and active data nodes.

4. The method as claimed in claim 1, further comprises transferring, by the at least one processor, the set of resiliency snapshots to a resiliency snapshot repository, wherein the resiliency snapshot repository being hosted on a cloud storage container or a distributed file storage.

5. The method as claimed in claim 1, wherein the method further comprises:

partially mounting the at least one index snapshot and selectively retrieving data using the mount option, and wherein the storage system is hosted at least on one of a cloud storage container or a distributed file storage.

6. The method as claimed in claim 1, wherein the method further comprises receiving, by the at least one processor, an asynchronous search engine request comprising a search query for a document referenced in the at least one index snapshot, wherein the asynchronous search engine request being processed by the search engine archive cluster.

7. The method as claimed in claim 6, wherein the method further comprises:

scanning, by the at least one processor, a localized cache associated with the archival search engine cluster for the queried document;

based on determining that the queried document is not available in the local cache, searching, by the at least one processor, the at least one index snapshot to search for the queried document;

retrieving, by the at least one processor, the queried document; and displaying, by the at least one processor, a response through an API, wherein the response comprising the queried document retrieved from the at least one index snapshot or the localized cache, or an error message indicating failure to locate the queried document.

8. The method as claimed in claim 7, comprising storing, by the at least one processor, metadata associated with the at least one index snapshot in the localized cache, wherein the metadata comprises information about structure and content of the at least one index snapshot; and performing subsequent search, by the at least one processor, utilizing the metadata.

9. The method as claimed in claim 1, wherein the method further comprising:

dynamically adjusting the first predefined time period and the second predefined time period based on any or a combination of system load or data volume.

10. A computing device configured to implement an execution of a method for data archiving in a distributed search and analytics environment, the computing device comprising:

a processor;

a memory; and a communication interface coupled to each of the processor and the memory, wherein the processor is configured to:

ingest a real-time data stream from at least one data source;

segment the ingested data stream into at least one segment and storing each of the at least one segment across a set of nodes in at least one search engine cluster;

capture a set of resiliency snapshots of the at least one segment and storing the captured set of resiliency snapshots of the at least one segment within the at least one search engine cluster after a first predefined time period;

create at least one index snapshot based on the stored set of resiliency snapshots through a clone Application Programming Interface (API) after a second predefined time period, wherein the at least one index snapshot is a reference to the stored set of resiliency snapshots, wherein the set of resiliency snapshots captures a current state of the at least one index snapshot, and wherein the current state represents a specific configuration, data, mappings, and settings that exist in the at least one index snapshot at the time the set of resiliency snapshots is captured;

mount the at least one index snapshot onto an archival search engine cluster using a mount option, wherein the archival search engine cluster comprises backup nodes associated with a storage system; and delete the at least one index snapshot from the at least one search engine cluster after mounting onto the archival search engine cluster, wherein data associated with the at least one index snapshot is migrated from active or archival data nodes to the backup nodes, thereby reducing requirement of the shard size and overall volume that needs to be managed by the at least one search engine cluster.

11. The computing device as claimed in claim 10, wherein the at least one data source of the real-time data stream comprises at least one of an Internet of Things (IoT) device, an online service, a sensor array, and a financial transactional system.

12. The computing device as claimed in claim 10, wherein the set of nodes comprises at least one or a combination of archival data nodes and active data nodes.

13. The computing device as claimed in claim 10, wherein the processor is further configured to transfer the set of resiliency snapshots to a resiliency snapshot repository, wherein the resiliency snapshot repository being hosted on a cloud storage container or a distributed file storage.

14. The computing device as claimed in claim 10, wherein the processor is further configured to partially mount the at least one index snapshot, and selectively retrieve data using the mount option, and wherein the storage system is hosted at least on one of a cloud storage container or a distributed file storage.

15. The computing device as claimed in claim 10, wherein the processor is further configured to receive an asynchronous search engine request comprising a search query for a document referenced in the at least one index snapshot, wherein the asynchronous search engine request being processed by the search engine archive cluster.

16. The computing device as claimed in claim 15, wherein the processor is further configured to:

scan a localized cache associated with the archival search engine cluster for the queried document;

based on determining that the queried document is not available in the local cache, search the at least one index snapshot to search for the queried document based on metadata associated with the at least one index;

retrieve the queried document; and display a response through an API, wherein the response comprises the queried document retrieved from the at least one index snapshot or the localized cache, or an error message indicating failure to locate the queried document.

17. The computing device as claimed in claim 16, wherein the processor is further configured to store metadata associated with the at least one index snapshot in the localized cache, wherein the metadata comprises information about structure and content of the at least one index snapshot, and wherein the processor is further configured to perform subsequent search utilizing the metadata.

18. The computing device as claimed in claim 10, wherein the processor is further configured to dynamically adjust the first predefined time period and the second predefined time period based on any or a combination of system load or data volume.

19. A non-transitory computer-readable storage medium storing instruction for data archiving in a distributed search and analytics environment, the storage medium comprising executable code which, when executed by a processor, caused the processor to:

ingest a real-time data stream from at least one data source;

segment the ingested data stream into at least one segment and storing each of the at least one segment across a set of nodes in at least one search engine cluster;

capture a set of resiliency snapshots of the at least one segment and storing the captured set of resiliency snapshots of the at least one segment within the at least one search engine cluster after a first predefined time period;

create at least one index snapshot based on the stored set of resiliency snapshots through a clone Application Programming Interface (API) after a second predefined time period, wherein the at least one index snapshot is a reference to the stored set of resiliency snapshots, wherein the set of resiliency snapshots captures a current state of the at least one index snapshot, and wherein the current state represents a specific configuration, data, mappings, and settings that exist in the at least one index snapshot at the time the set of resiliency snapshots is captured;

mount the at least one index snapshot onto an archival search engine cluster using a mount option, wherein the archival search engine cluster comprises backup nodes associated with a storage system; and delete the at least one index snapshot from the at least one search engine cluster after mounting onto the archival search engine cluster, wherein data associated with the at least one index snapshot is migrated from active or archival data nodes to the backup nodes, thereby reducing requirement of the shard size and overall volume that needs to be managed by the at least one search engine cluster.

20. The storage medium as claimed in claim 19, wherein when executed by the processor, the executable code further causes the processor to receive an asynchronous search engine request comprising a search query for a document referenced in the at least one index snapshot, wherein the asynchronous search engine request being processed by the search engine archive cluster.

* * * * *